UNITED STATES PATENT OFFICE.

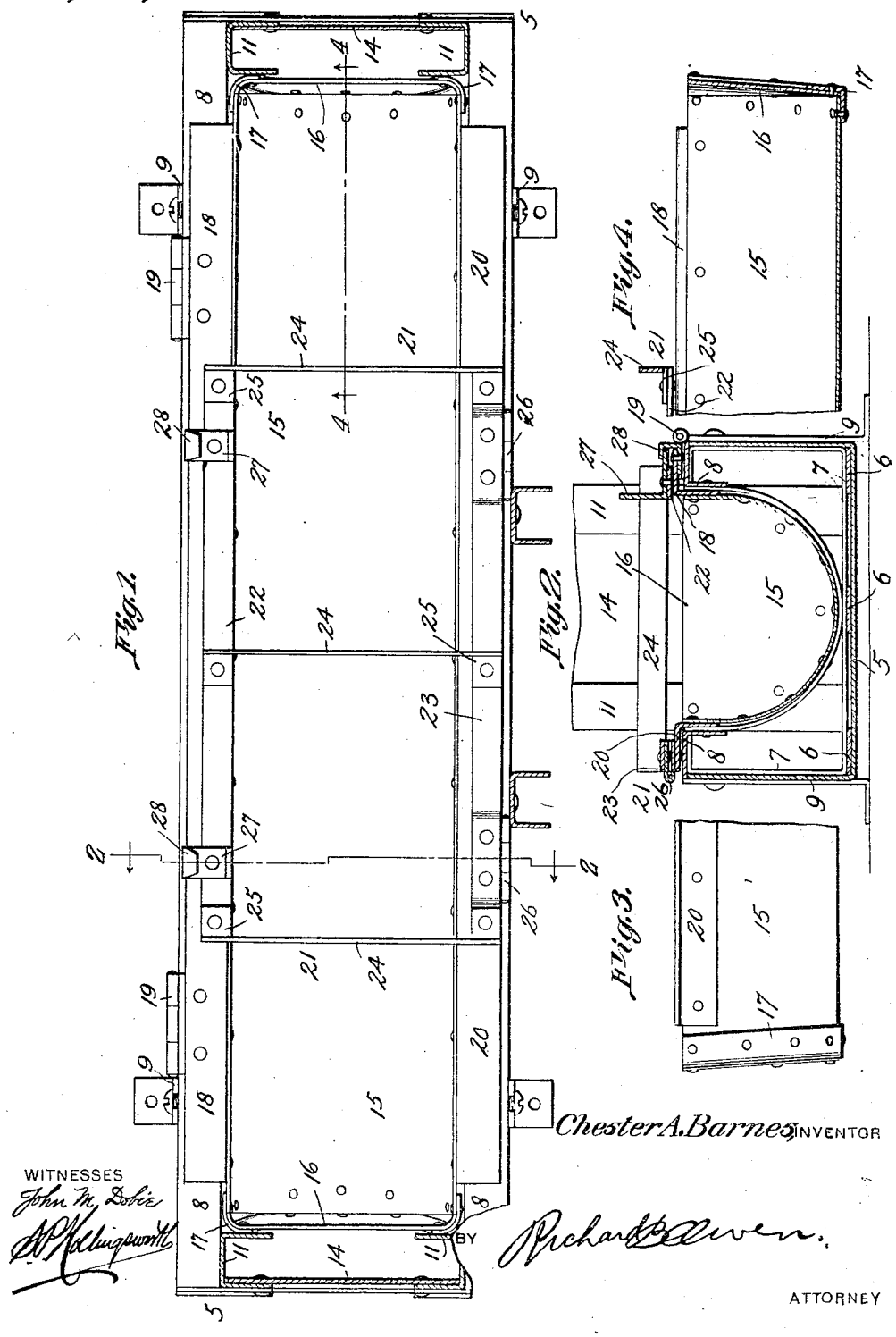

CHESTER A. BARNES, OF BLUE GRASS, IOWA.

ANIMAL FEED-TROUGH.

1,283,627.  Specification of Letters Patent.  Patented Nov. 5, 1918.

Application filed December 13, 1916. Serial No. 136,725.

*To all whom it may concern:*

Be it known that I, CHESTER A. BARNES, a citizen of the United States, residing at Blue Grass, in the county of Scott and State of Iowa, have invented certain new and useful Improvements in Animal Feed-Troughs, of which the following is a specification.

This invention relates to a feeding device for animals and particularly to the feed trough therefor, and designed primarily as a feed trough for swine. With this end in view the invention consists of an elongated semi-circular trough having closed ends and hinged to a base to permit the trough to be swung outwardly for the purpose of cleaning the same; and furthermore said trough is provided with a frame device overlying the top thereof and hinged thereto to divide the space included in the length of the trough into sections to prevent crowding of the animals thereto, and thereby enable them to obtain equal amounts of food from the trough.

A further object of the invention is to provide a trough of this character which shall be simple and inexpensive in construction, composed of few parts that are strong and readily assembled and so formed and combined as to resist wear, breakage and disorder in use, and which will prove thoroughly efficient in its attainment of the ends for which it is designed.

With these objects in view, together with others which will appear hereinafter, the invention resides in the novel construction, combination, and arrangement of parts hereinafter set forth, pointed out in the claims, and illustrated in the drawings, in which—

Figure 1 is a top plan view of the trough with parts of the supporting frame therefor shown in section, Fig. 2 is a vertical cross sectional view on the line 2—2 of Fig. 1, Fig. 3 is an elevation of one end of the feed trough proper, and Fig. 4 is a longitudinal sectional view of the other end of the feed trough.

This invention is designed as an improvement on a feed trough filed by me on the 14th day of July, 1916, and serially numbered 109386, which has since become the Patent Number 1,234,117, issued July 24, 1917, and is directed principally to the trough in which the food is placed for the animals to feed from.

In carrying out the invention, there is provided a base or support 5 in the form of an elongated trough-shaped structure of rectangular cross section with a horizontal bottom and vertical sides and preferably made of sheet metal. This base 5 is provided with interior longitudinal reinforcing bars 6 that extend from end to end of the base at opposite sides thereof, and spaced, transversely extending, bracing ribs 7 that lie along the bottom of the base 5 and up against the sides thereof, their upper ends being turned inwardly to support longitudinally disposed angle bars 8 that form flat bearing portions at the sides of the base 5 to receive and support the edges of the feed trough 15. The base 5 may be secured firmly in position upon any desirable support by means of legs 9 bolted in place and secured to the base 5 by bolts or screws 10 which enable the base to be removed from the legs when desired.

Extending upwardly from each end of the base 5 are uprights or posts 11 preferably made of channel iron and secured to the base adjacent the lateral sides thereof. The two posts at each end are connected by a transverse plate 14, and are braced longitudinally by suitable bars, not shown, in the drawings, but clearly indicated in the patent hereinbefore referred to.

Within the base and extending from end to end thereof is the feed trough 15 which forms the subject of the present invention, and as shown this trough is made of sheet metal of any desired length bent into semi-cylindrical form and provided with sheet metal ends 16 riveted to the body of the trough and strengthened at the corners by strips 17 riveted as shown. Riveted on the top edge at the front of the trough 15 is an angle bar 18 that extends substantially from end to end of the trough and has a horizontal member that overlies the angle bar 8 secured to the top of the base 5. The trough 15 is connected to the base 5 by hinge members 19 the leaves of said hinges being riveted to the angle bars 8 and 18 so that at any time desired the feed trough may be swung outwardly from the base so that the trough may be quickly and efficiently cleaned. A similar angle bar 20 is fastened on the rear edge of the feed trough 15 at the top thereof and extends throughout the length of the trough, said angle bar having hinged thereon an animal separating frame 21 comprising two longitudinal members 22 and 23 parallel to each other and overlying the angle bars 18 and 20, respectively. The members 22 and 23 are connected by vertically disposed flat bars 24 each having flanges 25 on the ends thereof that rest upon the two members and are riveted thereto. The bars 24 are spaced apart a distance sufficient to enable an animal to pass his head readily therebetween in order to feed from the trough, but close enough to prevent two animals occupying the same section. By means of this frame therefore, only a determined number of animals can feed out of one trough and they will be prevented by means of the bars 24 from crowding at any particular part of the trough as is common with animals, particularly hogs. The frame 21 does not extend the full length of the trough, the bars 24 at each end being spaced from the ends of the trough a distance substantially the same as that between two of the bars so that the entrance to the trough will be equally divided. The feed trough 15 may be made of any length and width suitable and convenient for the purpose, and the frame 21 will be divided into feeding sections commensurate with the length of the trough.

The frame 21 is hinged to the top of the angle bar 20 by hinges 26 riveted to the member 23 and to the angle bar 20. The opposite member 22 has one or more hooks or latches 27 pivoted thereon which may be turned when the frame 21 is closed over the trough and engage locking tongues 28 riveted fast on the angle bar 18.

In using the trough of the present invention, the frame 21 is folded over the trough as shown and secured in position by the latches 27 engaging the tongues 28. The feed is then introduced at one end of the trough and spread evenly therein from end to end, after which the animals are given access to the trough, and, as described, only a determined number can feed therefrom at the same time and each will be confined to its particular section as determined by the cross bars 24 and the ends of the trough. When it is desired to clean the trough, the latter is turned outwardly on its hinges 19 and the frame 21 also swung outwardly from the top of the trough by releasing the latches 27. This will carry both the trough and the frame wholly beyond the limits of the base. The trough will then be entirely open and may be thoroughly cleaned by throwing water thereon from a bucket or by means of a hose. The frame 24 can also be cleaned at the same time and should there be any dirt within the base 5, it also may be cleaned while the trough is in its outermost position. After cleaning the trough the frame may be returned to the working position in a manner readily understood.

What I claim is:

1. In an animal feeding device, the combination of a base, the bottom and sides of which are made of sheet metal, an angle bar extending longitudinally of the base on each side and at the top thereof, said bars being secured to the base, a semi-circular sheet metal feed trough having closed ends insertible within said base, an outwardly projecting angle bar secured to each side of said trough at the top and adapted to overlap and bear upon the angle bars secured to the base, hinges between said trough and base at one side to permit the trough to be swung out of the base, and a longitudinal frame transversely divided hinged to the opposite side of the trough and adapted to overlie the trough and divide the same into feeding spaces.

2. In an animal feeding device, the combination of a base having closed sheet metal sides and bottom and an open top, an angle bar fastened to each side of said base at the top and extending from end to end thereof, said angle bars projecting inwardly and downwardly, a semi-circular sheet metal feeding trough open at the top and insertible within said base, an angle bar fixed to each open side of said trough at the top thereof and projecting outwardly to overlie the angle bars secured to the base, hinges between one base angle bar and the overlying trough angle bar to allow the trough to be swung wholly free of the base, a frame adapted to be placed over said trough and to rest thereon, transverse bars dividing the frame into feeding spaces for the animals, hinges connecting said frame to the feeding trough on the side thereof opposite the hinges connecting the trough to the base, and means for locking the frame over the trough.

3. In an animal feeding device, the combination of a base having sheet metal bottom and sides and open at the top, angle bars secured to the top of said base and extending from end to end thereof, said angle bars projecting inwardly and downwardly, legs secured to said base for holding it above the ground, a semi-circular feeding trough made of sheet metal closed at its ends, a reinforcing strip at each corner of said trough riveted to the side and to the end for securing these parts together, an angle bar riveted on each outer side of the feed trough at the top thereof and projecting over the angle bars of the base to support said trough within the base, hinges between one of said base angle bars and the superposed angle bar of the trough at one side of the same to permit the trough to be swung entirely free of the base, a frame adapted to overlie the feeding trough, cross bars forming a part of said frame for dividing the same into feeding troughs for animals, hinges between said frame and one of the angles of the trough on the side thereof opposite the trough hinges to permit the frame to be swung free of the trough and in an opposite direction, and fastening means for holding the frame in position over the trough.

4. In an apparatus of the class described, a supporting structure, a trough hinged to swing at one side from said supporting structure, and a guard device including an oblong frame hingedly united to said trough at the side opposite to its hinged side and operating automatically to support the trough in overturned position.

5. In an apparatus of the class described, a supporting structure including an upper oblong frame, a trough including a laterally directed flange extending over said supporting structure, said trough being hingedly united by said flange to said supporting structure and adapted to swing at one side from the same, and a guard device including an oblong frame hingedly united to said trough at the side opposite to its hinged side and operating automatically to support the trough in overturned position.

6. In an apparatus of the class described, a tank shaped base open at its top, a feed trough extending throughout the length of the base hinged to one side of said base and capable of being swung into and out of the same, lateral flanges on the top of the feed trough for supporting the latter on the base when swung thereinto, and a dividing frame above the trough and hinged thereto on the side opposite the hinged side of the trough whereby said frame may swing with the trough or independently thereof.

7. In an apparatus of the class described, a tank shaped base open at its top, a feed trough extending throughout the length of said base hinged at one edge to said base and adapted to be swung into or out of the same, a dividing frame of equal width with said trough, hinges connecting one side of said frame with the side of the feed trough opposite the hinged connection therebetween and the base to enable said frame to form a support when the latter is in overturned position, transverse dividing bars connecting the longitudinal members of said frame, turn buttons or latches pivoted on the swinging side of said frame, and keepers on said trough adapted to receive said latches and lock the dividing frame in position on the trough to swing therewith.

In testimony whereof I affix my signature in presence of two witnesses.

CHESTER A. BARNES.

Witnesses:
RUDOLPH H. PLETT,
SELBY H. JOHNSON.